US011341688B2

(12) United States Patent
Zare et al.

(10) Patent No.: US 11,341,688 B2
(45) Date of Patent: May 24, 2022

(54) GUIDING DECODER-SIDE OPTIMIZATION OF NEURAL NETWORK FILTER

(71) Applicant: Nokia Technologies Oy, Espoo (FI)

(72) Inventors: Alireza Zare, Tampere (FI); Francesco Cricri, Tampere (FI); Yat Hong Lam, Tampere (FI); Miska Matias Hannuksela, Tampere (FI); Jani Olavi Lainema, Tampere (FI)

(73) Assignee: Nokia Technologies Oy, Espoo (FI)

( * ) Notice: Subject to any disclaimer, the term of this patent is extended or adjusted under 35 U.S.C. 154(b) by 62 days.

(21) Appl. No.: 17/038,439

(22) Filed: Sep. 30, 2020

(65) Prior Publication Data
US 2021/0104076 A1 Apr. 8, 2021

Related U.S. Application Data

(60) Provisional application No. 62/909,524, filed on Oct. 2, 2019.

(51) Int. Cl.
*G06T 9/00* (2006.01)
*H04N 19/154* (2014.01)
(Continued)

(52) U.S. Cl.
CPC ............ *G06T 9/002* (2013.01); *G06N 3/082* (2013.01); *H04N 19/103* (2014.11); *H04N 19/154* (2014.11); *H04N 19/172* (2014.11)

(58) Field of Classification Search
CPC .... G06T 9/002; H04N 19/103; H04N 19/154; H04N 19/172; G06N 3/082
(Continued)

(56) References Cited

U.S. PATENT DOCUMENTS

| 2018/0124422 A1 | 5/2018 | Van Leuven et al. |
| 2018/0174275 A1* | 6/2018 | Bourdev .................. G06N 3/08 |
| 2019/0139193 A1* | 5/2019 | Navarrete Michelini .................... G06T 3/4069 |

FOREIGN PATENT DOCUMENTS

| CN | 107197260 A | 9/2017 |
| WO | WO-2019/115865 A1 | 6/2019 |
| WO | WO-2019/197712 A1 | 10/2019 |

OTHER PUBLICATIONS

N. Sonehara et al.; "Image Data Compression Using a Neural Network Model"; 1989 Joint conference on Neural Networks; 1989; whole document (7 pages).

(Continued)

*Primary Examiner* — Allen C Wong
(74) *Attorney, Agent, or Firm* — Harrington & Smith

(57) ABSTRACT

Optimization of a neural network, for example in a video codec at the decoder side, may be guided to limit overfitting. The encoder may encode video(s) with different qualities for different frames in the video. Low-quality frames may be used as both input and ground-truth during optimization. High-quality frames may be used to optimize the neural network so that higher-quality versions of lower-quality inputs may be predicted. The neural network may be trained to make such predictions by making a prediction based on a constructed low-quality input for which the corresponding high-quality version is known, comparing the prediction to the high-quality version, and fine-tuning the neural network to improve its ability to predict a high-quality version of a low-quality input. To limit overfitting, the neural network may be concurrently or in an alternating fashion trained with low-quality input for which a higher-quality version of the low-quality input is known.

20 Claims, 12 Drawing Sheets

(51) Int. Cl.
*G06N 3/08* (2006.01)
*H04N 19/172* (2014.01)
*H04N 19/103* (2014.01)

(58) Field of Classification Search
USPC .......................................... 706/21
See application file for complete search history.

(56) References Cited

OTHER PUBLICATIONS

M. Shahid et al.; "A Reduced Complexity No-Reference Artificial Neural Network Based Video Quality Predictor"; 2011 4th International Congress on Image and Signal Processing; Shanghai, China; Oct. 15-17, 2011; whole document (5 pages).

* cited by examiner

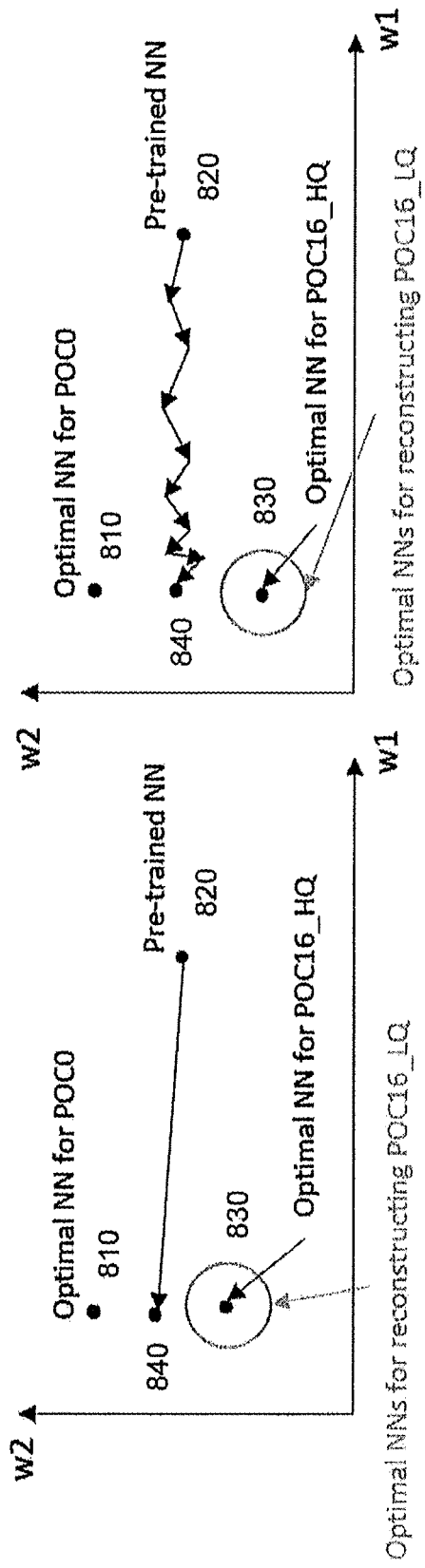

1400

```
┌─────────────────────────────────────────────────┐
│ Receive, at a decoder, two frames, wherein      │
│ the two frames comprise a first lower-quality   │
│ frame and a second lower-quality frame,         │  1410
│ wherein the first lower-quality frame is derived│
│ from a first higher-quality frame               │
└─────────────────────────────────────────────────┘
                        ▼
┌─────────────────────────────────────────────────┐
│ Predict, with a neural network of the decoder,  │
│ a first predicted frame based, at least         │  1420
│ partially, on a first of the two frames         │
└─────────────────────────────────────────────────┘
                        ▼
┌─────────────────────────────────────────────────┐
│ Compute a first loss based on the first         │
│ predicted frame and one of:                     │
│                                                 │
│   where the first of the two frames comprises   │
│   the first lower-quality frame, the first      │  1430
│   higher-quality frame, or                      │
│                                                 │
│   where the first of the two frames comprises   │
│   the second lower-quality frame, the second    │
│   lower-quality frame                           │
└─────────────────────────────────────────────────┘
                        ▼
┌─────────────────────────────────────────────────┐
│ Adjust the neural network based, at least       │  1440
│ partially, on the first loss                    │
└─────────────────────────────────────────────────┘
                        ▼
┌─────────────────────────────────────────────────┐
│ Predict, with the adjusted neural network, a    │
│ second predicted frame based, at least          │
│ partially, on a second of the two frames,       │  1450
│ where the second of the two frames is different │
│ from the first of the two frames                │
└─────────────────────────────────────────────────┘
                        ▼
┌─────────────────────────────────────────────────┐
│ Compute a second loss based on the second       │
│ predicted frame and one of:                     │
│                                                 │
│   where the second of the two frames comprises  │
│   the first lower-quality frame, the first      │  1460
│   higher-quality frame, or                      │
│                                                 │
│   where the second of the two frames comprises  │
│   the second lower-quality frame, the second    │
│   lower-quality frame                           │
└─────────────────────────────────────────────────┘
                        ▼
┌─────────────────────────────────────────────────┐
│ Adjust the adjusted neural network based, at    │  1470
│ least partially, on the second loss             │
└─────────────────────────────────────────────────┘
```

FIG. 14

GUIDING DECODER-SIDE OPTIMIZATION OF NEURAL NETWORK FILTER

CROSS-REFERENCE TO RELATED APPLICATIONS

This application claims the benefit of U.S. Provisional Application No. 62/909,524, filed on Oct. 2, 2019, the disclosures of which are incorporated by reference in their entireties.

The project leading to this application has received funding from the ECSEL Joint Undertaking (JU) under grant agreement No 783162. The JU receives support from the European Union's Horizon 2020 research and innovation programme and Netherlands, Czech Republic, Finland, Spain, Italy.

BACKGROUND

Technical Field

The example and non-limiting embodiments relate generally to multimedia encoding and decoding. More specifically, the example and non-limiting embodiments relate to a neural network acting as a filter.

BRIEF DESCRIPTION OF PRIOR DEVELOPMENTS

It is known, in machine learning, to construct and train a neural network for various functions, including as a decoder in multimedia compression and decompression.

BRIEF DESCRIPTION OF THE DRAWINGS

The foregoing aspects and other features are explained in the following description, taken in connection with the accompanying drawings, wherein:

FIG. 8a is a graph illustrating features as described herein;
FIG. 8b is a graph illustrating features as described herein.

FIG. 14 is a flowchart illustrating steps as described herein; and

DETAILED DESCRIPTION OF EMBODIMENTS

Figure 1:
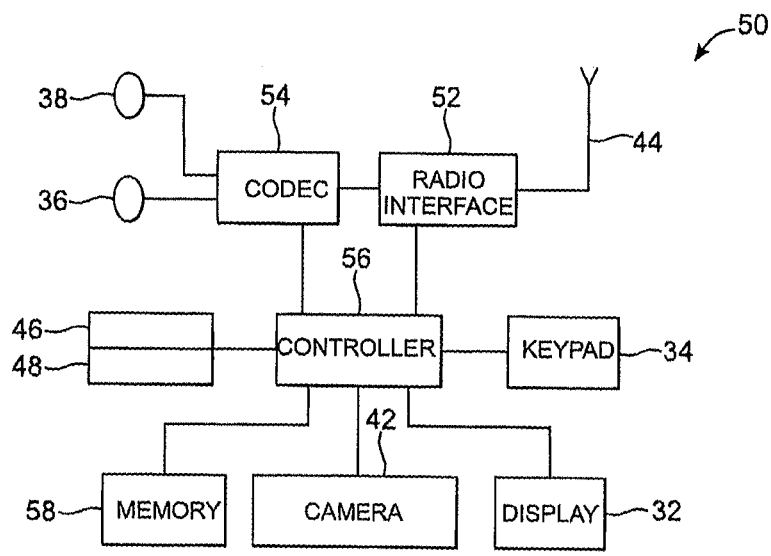
FIG. 1 shows schematically an electronic device employing embodiments of the invention.

The following abbreviations that may be found in the specification and/or the drawing figures are defined as follows:
CDMA code division multiple access
DCT discrete cosine transform
DSP digital signal processor
FDMA frequency division multiple access
FQP frame-level quantization parameter
GOP groups of pictures
GSM global systems for mobile communication
GT ground truth
IMD integrated messaging device
IoT internet of things
ISOBMFF ISO base media file format
MMS multimedia messaging service
MSE minimum squared error
NAL network abstraction layer
NN neural network
PC personal computer
PDA personal digital assistant
PID packet identifier
POC picture order coding
PLC power line connection
PSNR peak signal-to-noise ratio
QP quantization parameter
RAS random access segment
SEI supplemental enhancement message
SMS short messaging service
SQP sequence level quantization parameter
SSIM structural similarity index
TCP-IP transmission control protocol-internet protocol
TDMA time division multiple access
TS transport stream
UICC universal integrated circuit card
UMTS universal mobile telecommunications system
WLAN wireless local area network In the following, several embodiments will be described in the context of encoding and decoding visual data, such as video frames. It is to be noted, however, that the embodiments are not limited to processing of visual data, but rather the different embodiments may have application(s) in any environment where any media content can be streamed and compressed. Thus, applications including but not limited to, for example, streaming of speech or other audio data may benefit from the use of the embodiments.

Figure 2:
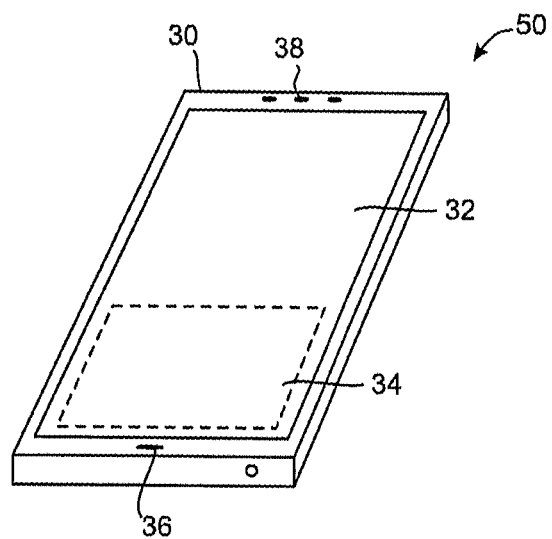
FIG. 2 shows schematically a user equipment suitable for employing embodiments of the invention.

The following describes in further detail suitable apparatus and possible mechanisms for running a neural network according to embodiments. In this regard, reference is first made to FIGS. 1 and 2, where FIG. 1 shows an example block diagram of an apparatus 50. The apparatus may be an Internet of Things (IoT) apparatus configured to perform various functions, such as, for example, gathering information by one or more sensors, receiving or transmitting information, analyzing information gathered or received by the apparatus, or the like. The apparatus may comprise a video coding system, which may incorporate a codec. FIG. 2 shows a layout of an apparatus according to an example embodiment. The elements of FIGS. 1 and 2 will be explained next.

The electronic device 50 may for example be a mobile terminal or user equipment of a wireless communication system, a sensor device, a tag, or other lower power device.

However, it would be appreciated that embodiments of the invention may be implemented within any electronic device or apparatus which may process data by neural networks.

Referring now to FIG. 2, the apparatus 50 may comprise a housing 30 for incorporating and protecting the device. Referring now to both FIGS. 1 and 2, the apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera 42 capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

Referring now to FIG. 1, the apparatus 50 may comprise a controller 56, processor or processor circuitry for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and/or decoding of audio and/or video data or assisting in coding and/or decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and/or for receiving radio frequency signals from other apparatus(es).

The apparatus 50 may comprise a camera 42 capable of recording or detecting individual frames which are then passed to the codec 54 or the controller 56 for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

The memory 58 may be of any type suitable to the local technical environment and may be implemented using any suitable data storage technology, such as semiconductor based memory devices, flash memory, magnetic memory devices and systems, optical memory devices and systems, fixed memory and removable memory. The memory 58 may be a non-transitory memory. The memory 58 may be means for performing storage functions. The controller 56 may be or comprise one or more processors, which may be of any type suitable to the local technical environment, and may include one or more of general purpose computers, special purpose computers, microprocessors, digital signal processors (DSPs) and processors based on a multi-core processor architecture, as non-limiting examples. The controller 56 may be means for performing functions.

Figure 3:
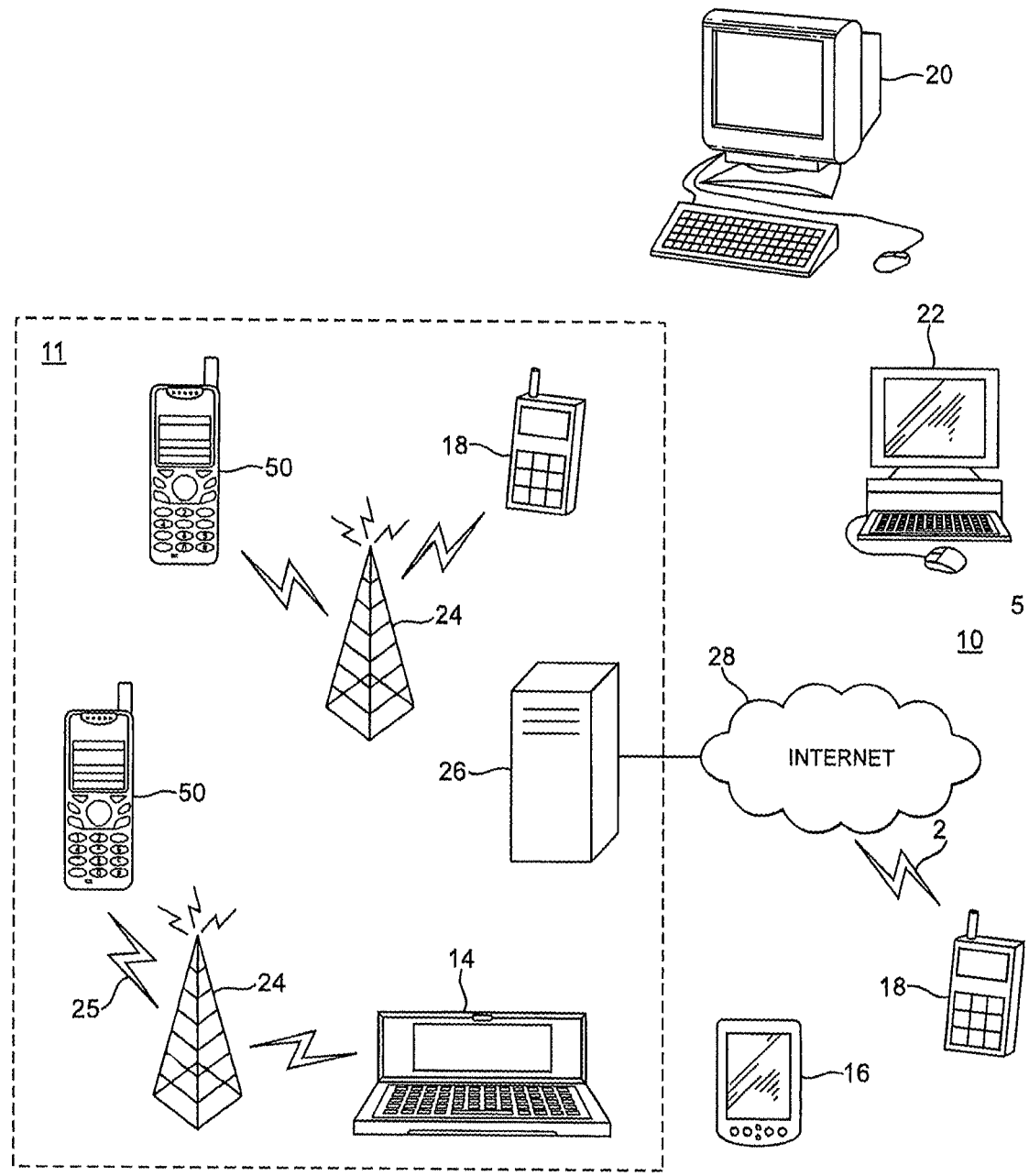
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA, 4G, 5G network etc.), a wireless local area network (WLAN) such as defined by any of the IEEE 802.x standards, a Bluetooth personal area network, an Ethernet local area network, a token ring local area network, a wide area network, and/or the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22, etc. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware and/or software to process neural network data, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, 3GPP Narrowband IoT and any similar wireless communication technology. A communications device involved in implementing various embodiments of the present invention may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

The embodiments may also be implemented in so-called IoT devices. The Internet of Things (IoT) may be defined, for example, as an interconnection of uniquely identifiable embedded computing devices within the existing Internet infrastructure. The convergence of various technologies has and will enable many fields of embedded systems, such as wireless sensor networks, control systems, home/building automation, etc. to be included in the Internet of Things (IoT). In order to utilize the Internet, IoT devices are provided with an IP address as a unique identifier. IoT devices may be provided with a radio transmitter, such as WLAN or Bluetooth transmitter or a RFID tag. Alternatively, IoT devices may have access to an IP-based network via a wired network, such as an Ethernet-based network or a power-line connection (PLC).

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

Figure 4:
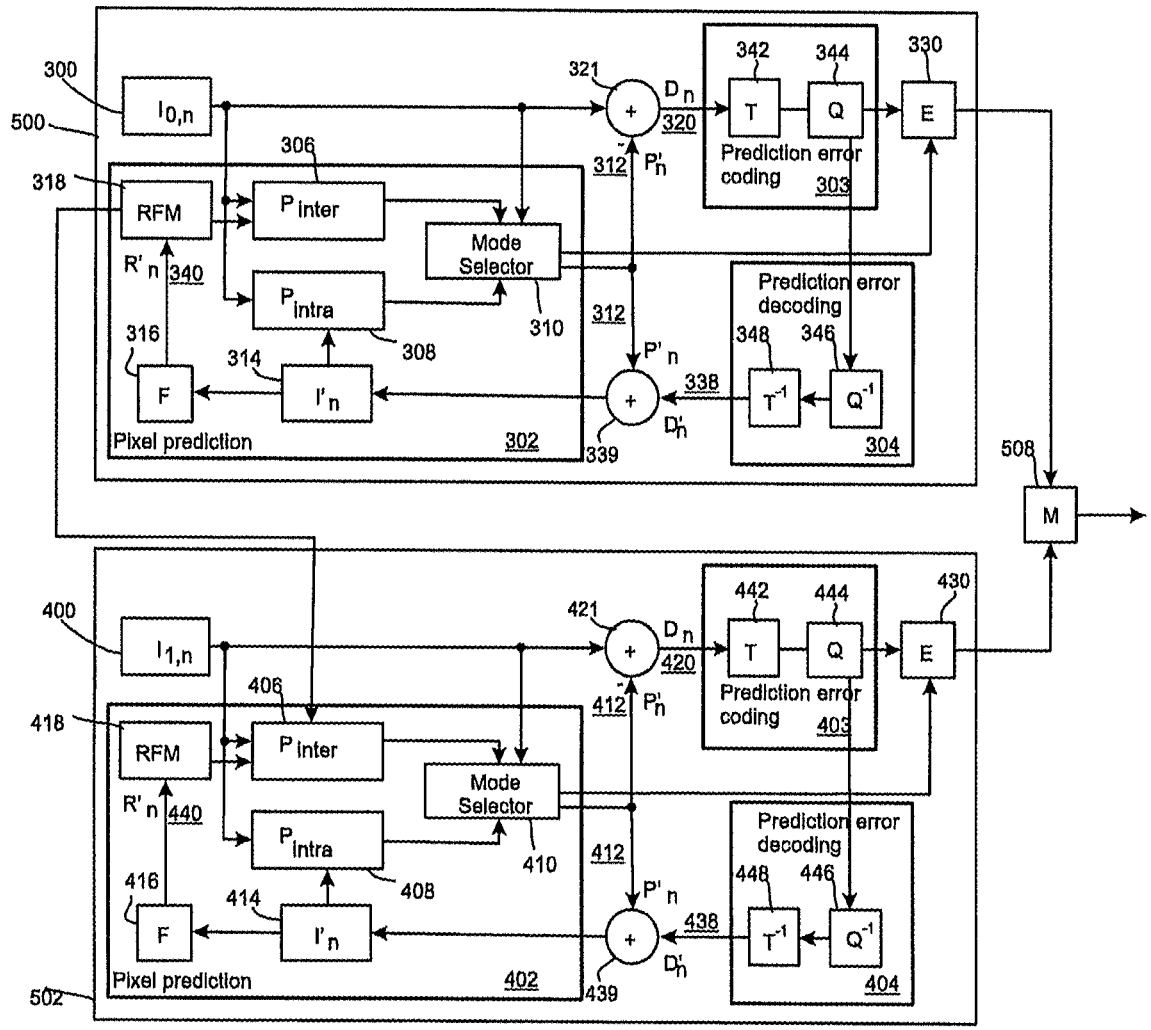
FIG. 4 shows schematically a block chart of an encoder on a general level.

FIG. 4 shows a block diagram of a general structure of a video encoder. FIG. 4 presents an encoder for two layers, but it would be appreciated that presented encoder could be similarly extended to encode more than two layers. FIG. 4 illustrates a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 may receive, at 300, base layer images of a video stream to be encoded at both the inter-predictor 306 (which may determine the difference between the image and a motion compensated reference frame, i.e. from 318) and the intra-predictor 308 (which may determine a prediction for an image block based only on the already processed parts of current frame or picture). The output of both the inter-predictor and the intra-predictor may be passed to the mode selector 310. The intra-predictor 308 may have more than one intra-prediction mode. Hence, each mode may perform the intra-prediction and provide the predicted signal to the mode selector 310. The mode selector 310 may also receive a copy of the base layer picture, i.e. from 300. Correspondingly, the pixel predictor 402 of the second encoder section 502 may receive, at 400, enhancement layer images of a video stream to be encoded at both the inter-predictor 406 (which may determine the difference between the image and a motion compensated reference frame, i.e. from 418) and the intra-predictor 408 (which may determine a prediction for an image block based only on the already processed parts of current frame or picture). The output of both the inter-predictor and the intra-predictor may be passed to the mode selector 410. The intra-predictor 408 may have more than one intra-prediction mode. Hence, each mode may perform the intra-prediction and provide the predicted signal to the mode selector 410. The mode selector 410 may also receive a copy of the enhancement layer picture, i.e. from 400.

Depending on which encoding mode is selected to encode the current block, the output of the inter-predictor 306, 406 or the output of one of the optional intra-predictor modes or the output of a surface encoder within the mode selector may be passed to the output of the mode selector 310, 410. The output of the mode selector may be passed to a first summing device 321, 421. The first summing device may subtract the output of the pixel predictor 302, 402 from the base layer picture, i.e. from 300/enhancement layer picture, i.e. from 400 to produce a first prediction error signal 320, 420 which may be input to the prediction error encoder 303, 403.

The pixel predictor 302, 402 may further receive from a preliminary reconstructor 339, 439 the combination of the prediction representation of the image block 312, 412 and the output 338, 438 of the prediction error decoder 304, 404. The preliminary reconstructed image may be passed 314, 414 to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture, i.e. from 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which future enhancement layer picture(s), i.e. from 400 is compared in inter-prediction operations. Moreover, the reference frame memory 418 may be connected to the inter-predictor 406 to be used as the reference image against which a future enhancement layer picture, i.e. from 400, is compared in inter-prediction operations.

Filtering parameters from the filter 316 of the first encoder section 500 may be provided to the second encoder section 502 subject to the base layer being selected and indicated to be a source for predicting the filtering parameters of the enhancement layer according to some embodiments.

The prediction error encoder 303, 403 may comprise a transform unit 342, 442 and a quantizer 344, 444. The transform unit 342, 442 may transform the first prediction error signal 320, 420 to a transform domain. The transform may be, for example, the DCT transform. The quantizer 344, 444 may quantize the transform domain signal, e.g. the DCT coefficients, to form quantized coefficients.

The prediction error decoder 304, 404 may receive the output from the prediction error encoder 303, 403 and perform the opposite processes of the prediction error encoder 303, 403 to produce a decoded prediction error signal 338, 438 which, when combined with the prediction representation of the image block 312, 412 at the second summing device 339, 439, may produce the preliminary reconstructed image, i.e. at 314, 414. The prediction error decoder may be considered to comprise a dequantizer 346, 446 which may dequantize the quantized coefficient values, e.g. DCT coefficients, to reconstruct the transform signal and an inverse transformation unit 348, 448, which may perform the inverse transformation to the reconstructed transform signal wherein the output of the inverse transformation unit 348, 448 contains reconstructed block(s). The prediction error decoder 304, 404 may also comprise a block filter which may filter the reconstructed block(s) according to further decoded information and filter parameters.

The entropy encoder 330, 430 may receive the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

Features as described herein generally relate to optimization of a neural network filter in a video codec at the decoder side. In particular, features as described herein generally relate to guiding such optimization to limit overfitting.

A neural network (NN) is a computation graph consisting of two or more layers of computation. Each layer consists of one or more units, where each unit performs an elementary computation. A unit is connected to one or more other units, and the connection may have a weight associated with it. The weight may be used for scaling the signal passing through the associated connection. Weights may be learnable parameters, i.e., values which can be learned from training data. There may be other learnable parameters, such as those of batch-normalization layers.

Two of the most widely used architectures for neural networks are feed-forward and recurrent architectures. Feed-forward neural networks do not comprise a feedback loop; each layer takes input from one or more of the previous layers and provides output, which is used as the input for one or more of the subsequent layers. Units within a layer take input from unit(s) in one or more of preceding layers, and provide output to unit(s) of one or more following layers.

Initial layers, i.e. layers close to the input data, extract semantically low-level features from received data, such as edges and textures in images, and intermediate and final layers extract more high-level features. After the feature extraction layers there may be one or more layers performing a certain task, such as classification, semantic segmentation, object detection, denoising, style transfer, super-resolution, etc.

In recurrent neural nets, there is a feedback loop, so that the network becomes stateful, i.e., it is able to memorize or retain information or a state.

Neural networks may be utilized in an ever increasing number of applications for many different types of device, such as mobile phones, as described above. Examples may include image and video analysis and processing, social media data analysis, device usage data analysis, etc.

Neural nets, and other machine learning tools, may be able to learn properties from input data, either in a supervised way or in an unsupervised way. Such learning may be the result of a training algorithm, or of a meta-level neural network providing a training signal.

A training algorithm may consist of changing some properties of the neural network so that the output of the neural network is as close as possible to a desired output. For example, in the case of classification of objects in images, the output of the neural network may be used to derive a class or category index, which indicates the class or category to which an object in the input image belongs. Training may comprise changing properties of the neural network so as to minimize or decrease the output's error, also referred to as the loss. Examples of losses include mean squared error, cross-entropy, etc. In recent deep learning techniques, training is an iterative process, where, at each iteration, the algorithm modifies the weights of the neural network to make a gradual improvement of the network's output, i.e., to gradually decrease the loss.

In this description, the terms "model", "neural network", "neural net," and "network" may be used interchangeably. In this description, the terms "weights" of neural networks, "learnable parameters," and "parameters" may be used interchangeably.

Training a neural network comprises an optimization process, but the final goal of machine learning is different from the typical goal of optimization. In optimization, the goal is to minimize loss. In machine learning generally, in addition to the goal of optimization, the goal is to make the model learn the properties of the data distribution from a limited training dataset. In other words, the training process is additionally used to ensure that the neural network learns to use a limited training dataset in order to learn to generalize to previously unseen data, i.e., data which was not used for training the model. This additional goal is usually referred to as generalization.

In practice, data may be split into at least two sets, the training set and the validation set. The training set may be used for training the network, i.e., for modification of its learnable parameters in order to minimize the loss. The validation set may be used for checking the performance of the neural network with data which was not used to minimize the loss (i.e. which was not part of the training set), where the performance of the neural network with the validation set may be an indication of the final performance of the model. The errors on the training set and on the validation set may be monitored during the training process to understand if the neural network is learning at all and if the neural network is learning to generalize. In the case that the network is learning at all, the training set error should decrease. If the network is not learning, the model may be in the regime of underfitting. In the case that the network is learning to generalize, validation set error should decrease and not be much higher than the training set error. If the training set error is low, but the validation set error is much higher than the training set error, or the validation set error does not decrease, or it even increases, the model may be in the regime of overfitting. Overfitting may mean that the model has memorized the training set's properties and performs well only on that set, but performs poorly on a set not used for tuning its parameters. In other words, the model has not learned to generalize.

Neural networks may be used for compressing and de-compressing data such as images. The most widely used architecture for compressing and de-compressing data is the auto-encoder, which may be a neural network consisting of two parts: a neural encoder and a neural decoder. In this description, a neural encoder may be referred to an encoder, and a neural decoder may be referred to as a decoder. An encoder and a decoder may comprise algorithms which are learned from data instead of being tuned by hand.

The encoder may take as input an image and produce a code which requires less bits than the input image. This code may be obtained by a binarization or quantization process after the encoder. The decoder may take this code and use it to reconstruct the image which was input to the encoder.

An encoder and decoder may be trained to minimize a combination of bitrate and distortion, where the distortion metric is usually Mean Squared Error (MSE), PSNR, SSIM, etc. These distortion metrics are meant to be inversely proportional to the human visual perception quality. In other words, a lower measurement with a distortion metric corresponds to a better perceived quality of the decompressed image.

A video codec may consist of an encoder that transforms the input video into a compressed representation suited for storage/transmission and a decoder that can decompress the compressed video representation back into a viewable form. An encoder may discard some information from the original video sequence in order to represent the video in a more compact form (i.e. at a lower bitrate).

A hybrid video codec, for example ITU-T H.263 and H.264, may encode video information in two phases. In a first phase, pixel values in a certain picture area (or "block") may be predicted, for example by motion compensation means (finding and indicating an area in one of the previously coded video frames that corresponds closely to the block being coded) or by spatial means (using the pixel values around the block to be coded in a specified manner). Other means for predicting pixel values may be known to one of ordinary skill in the art. In a second phase, the prediction error, i.e. the difference between the predicted block of pixels and the original block of pixels, may be coded. This may be done by transforming the difference in pixel values using a specified transform (e.g. Discrete Cosine Transform (DCT) or a variant of it), quantizing the coefficients, and entropy coding the quantized coefficients. By varying the fidelity of the quantization process, an encoder may control the balance between the accuracy of the pixel representation (picture quality) and size of the resulting coded video representation (file size or transmission bitrate).

Inter prediction (which may also be referred to as temporal prediction, motion compensation, or motion-compensated prediction) exploits temporal redundancy. In inter prediction, the sources of prediction may be previously decoded pictures.

Intra prediction utilizes the fact that adjacent pixels within the same picture are likely to be correlated. Intra prediction may be performed in the spatial domain or the transform domain, i.e., either sample values or transform coefficients may be predicted. Intra prediction is typically exploited in intra coding, where no inter prediction is applied.

The second phase of the encoding procedure, comprising coding of a prediction error, may result in a set of coding parameters, such as motion vectors and quantized transform coefficients. Many parameters may be entropy-coded more efficiently if they are predicted first from spatially or temporally neighboring parameters. For example, a motion vector may be predicted from spatially adjacent motion vectors. The difference relative to the motion vector predictor may be coded. Prediction of coding parameters and intra prediction may be collectively referred to as in-picture prediction.

The decoder may reconstruct the output video from the compressed version of the video by applying prediction means similar to the encoder to form a predicted representation of the pixel blocks (using the motion or spatial information created by the encoder and stored in the compressed representation) and prediction error decoding (inverse operation of the prediction error coding, comprising recovering the quantized prediction error signal in the spatial pixel domain). After applying prediction and prediction error decoding means, the decoder may sum up the prediction and prediction error signals (pixel values) to form the output video frame. The decoder (and encoder) may also apply additional filtering means to improve the quality of the output video before passing it for display and/or storing it as prediction reference for the forthcoming frames in the video sequence.

In a video codec, the motion information may be indicated with motion vectors associated with each motion compensated image block. Each of these motion vectors may represent the displacement of the image block in the picture to be coded (on the encoder side) or decoded (on the decoder side) and the prediction source block in one of the previously coded or decoded pictures upon which the displacement value is based.

In order to represent motion vectors efficiently, motion vectors may be coded differentially with respect to block-specific predicted motion vectors. The predicted motion vectors may be created in a predefined way, for example by calculating the median of the encoded or decoded motion vectors of the adjacent blocks. Another way to create predicted motion vectors may be to generate a list of candidate predictions from adjacent blocks and/or co-located blocks in temporal reference pictures and signaling the chosen candidate as the motion vector predictor. Other methods for creating predicted motion vectors may be known to one of ordinary skill in the art.

In addition to predicting the motion vector values, the reference index of a previously coded/decoded picture may be predicted. The reference index may be predicted from adjacent blocks and/or co-located blocks in a temporal reference picture. Moreover, typical high-efficiency video codecs may employ an additional motion information coding/decoding mechanism, often called merging/merge mode, where all the motion field information, which may include motion vector and corresponding reference picture index for each available reference picture list, may be predicted and used without any modification/correction. Similarly, predicting the motion field information may comprise using the motion field information of adjacent blocks and/or co-located blocks in temporal reference pictures, and the used or chosen motion field information may be signaled, where the used or chosen motion field information may be from a list of motion field candidate(s) filled with motion field information of available adjacent/co-located blocks.

In a video encoder, the prediction residual after motion compensation may first be transformed with a transform kernel (like DCT) and then coded. The reason for this is that, often, there may still exist some correlation among the prediction residual, and transform may help reduce this correlation and provide more efficient coding.

A video encoder may utilize Lagrangian cost function(s) to find optimal coding modes, e.g. the desired Macroblock mode and associated motion vectors. These cost functions may use a weighting factor λ to tie together the (exact or estimated) image distortion due to lossy coding methods and the (exact or estimated) amount of information that is required to represent the pixel values in an image area according to:

$$C = D + \lambda R$$

where C is the Lagrangian cost to be minimized, D is the image distortion (e.g. Mean Squared Error) with the mode and motion vectors considered, and R the number of bits needed to represent the required data to reconstruct the image block with the decoder (including the amount of data to represent the candidate motion vectors).

Image and video codecs may use a set of filters to enhance the visual quality of the predicted visual content and can be applied either in-loop or out-of-loop, or both. In the case of in-loop filters, the filter applied on one block in the currently-encoded frame may affect the encoding of another block in the same frame and/or in another frame which may be predicted from the current frame. An in-loop filter may affect the bitrate and/or the visual quality of the output. An enhanced block may cause a smaller residual (difference between original block and predicted-and-filtered block), thus requiring less bits to be encoded.

An out-of-the loop filter may be applied on a frame after it has been reconstructed. The filtered visual content may not be a source for prediction, and thus it may only impact the visual quality of the frames that are output by the decoder.

In example embodiments, a neural network (NN) may be used in addition to or as a filter in a video codec. Neural networks perform quite well in terms of generalization. This means that a NN trained on a sufficiently-big dataset is able to perform its task with relatively high accuracy also on unseen data which is sampled from a dataset of the same (or very similar) probability distribution as the training dataset. However, even in the best case (where the training is performed so that generalization is maximized), the NN is trained to be good "on average" on any new data points from the target data distribution. Example embodiments may further optimize the performance of the NN in the case of a restricted manifold or subset of the dataset.

In an example embodiment, a method may be provided for effectively optimizing a neural network filter in a video codec at the decoder side. In an example embodiment, a method may be provided for guiding such optimization in order to limit overfitting to the wrong data.

A decoder may use higher-quality frames or blocks in a video segment as ground-truth for optimizing the NN, so that the optimized NN is improved also on lower-quality frames or blocks. However, such an encoder may train a NN to deviate too much from the low-quality frames or blocks, as it overfits to the high-quality frames or blocks. In an example embodiment, a decoder may be provided that uses low-quality frames or blocks, in addition to high-quality frames or blocks, during the optimization process. In an example embodiment, a decoder may be provided that uses the same low-quality frames as both input and ground-truth during the optimization. This may be due to the unavailability of other ground-truth information for the lower-quality frames. Example embodiments may optimize a neural network used as a filter in a video codec at the decoder side to avoid overfitting.

While example embodiments of the present disclosure may focus on redundancies and correlations which exist in video data in the temporal dimension in the case of compressing and decompressing video data, any other data domain where there is correlation between different data points may be considered, such as different parts of an image, or different views in a multi-view capturing setup. The example embodiments are not limited to the temporal domain. One of ordinary skill in the art may understand the application of example embodiments to the spatial, frequency, or another domain.

In an example embodiment, an encoder and a decoder may be provided that run on one or more devices that are capable of performing both inference and training of neural networks. The encoder may encode video(s) having different qualities for different frames in the video, i.e., some frames are encoded with higher quality, and some frames are encoded with lower quality so that they can be predicted (or use information) from the higher-quality frames during decoding. An example of such an encoder or codec may be a H.265 or a H.266.

In the encoding and decoding process, frames may be organized in Groups of Pictures (GOPs). Within a GOP, pictures may be predicted hierarchically. A Random Access Segment (RAS) may start with a randomly accessible frame that can be decoded without referencing other frames and may be followed by one or more GOPs in decoding order. One GOP may, for example, comprise 16 frames, as in some of the latest codecs, where the highest quality frame is the 1st frame, which may be referred to as Picture Order Coding 0 (POC0). POC0 may be the first frame encoded and decoded in the RAS. The second frame of the GOP to be encoded and decoded may be the frame with POC equal to 16 (17th frame).

A sequence of frames may be encoded by setting a quantization parameter (QP), which may be the main quality factor that a user specifies. The QP may be a sequence-level QP (SQP). It should be noted that there may be additional parameters which may be set that may also affect the encoding process. A higher QP may mean that coarser quantization will be used, and thus lower visual quality and lower bitrate may be achieved.

Each frame in the GOP may be encoded using a different QP derived from the SQP. The different QP used to encode each frame may be referred to as the frame-level QP (FQP). For example, if the SQP for a GOP is set to 37, the FQP for POC0 may be 34 and the FQP for POC16 may be 38. However, these are only examples; a person of ordinary skill in the art may be familiar with alternative methods of deriving the POC0's and POC16's FQPs.

A method may be provided where the higher-quality information contained in POC0 is used to optimize the NN and specialize it to the current GOP or RAS. The main assumption may be that the visual content within the GOP or RAS is correlated, which may be a valid assumption if the frame rate is not too small and if the captured content does not move or change too much, and this assumption may actually be satisfied in most practical situations.

Figure 5:
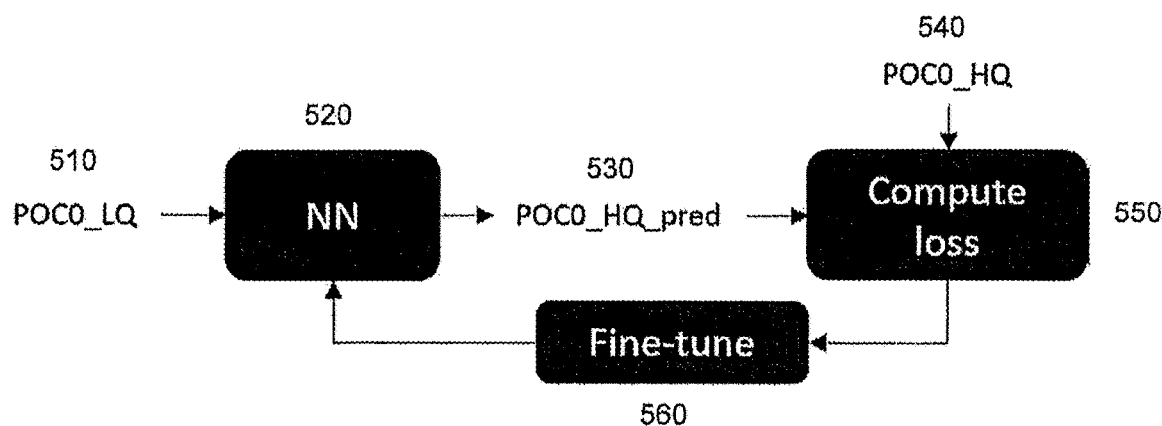
FIG. 5 is a diagram illustrating features as described herein.

Referring now to FIG. 5, illustrated is an example of optimization of a neural network. A similar process may be described in PCT/FI2019/050256, which is hereby incorporated by reference in its entirety. The neural network 520 may be optimized to predict a higher-quality version of lower-quality input. The neural network 520 may be trained to make this prediction by having the neural network 520 make a prediction based on a constructed low-quality input for which the corresponding high-quality version is known, comparing the prediction to the high-quality version, and fine-tuning the neural network 520 to improve its ability to predict a high-quality version of a low-quality input. POC0_LQ, 510, may be the first frame of the GOP or RAS, which may be derived from an original POC0 (here referred also as POC0_HQ) by reducing its quality, for example by re-quantization using a higher QP than POC0_HQ's FQP. In other words, POC0_LQ, 510, may be a lower-quality version of POC0_HQ, 540, (which may be the same as POC0) that may have been created for the purpose of training the neural network, 520. POC0_LQ, 510, may have a similar quality as POC16, i.e. the last frame in the GOP or RAS.

The neural network 520 may be, for example, a fully-convolutional architecture, such as a fully-convolutional auto-encoder. The neural network 520 may be pre-trained on a sufficiently-big dataset and then delivered to or used with the decoder, and may also be delivered to or used with the encoder (for example if the filtering is performed in-loop). Alternatively, the NN 520 may be initialized using a common neural network initialization method.

The neural network 520 may make a prediction, depicted in FIG. 5 by POC0_HQ_pred, 530. POC0_HQ_pred, 530, may be an estimation or prediction of POC0_HQ 540 based on lower quality version input POC0_LQ, 510.

At 550, a loss may be computed, wherein the loss may be a training loss which is suitable for regression problems, such as mean-squared error (MSE), cross-entropy, etc. At 560, the decoder may perform a fine-tuning of the pre-trained or randomly initialized NN 520 based on the loss computed at 550. It should be noted that the example of FIG. 5 is not intended to limit the architecture or training loss with which an example embodiment may be practiced, although the examples given here represent typical choices.

After fine-tuning, the NN 520 may be applied on the POC16, which may be referred to as POC16_LQ because it is of a lower-quality than POC0. POC0_LQ, 510, and POC0_HQ, 540 may be considered part of a training set, whereas POC16 may be considered to be part of a validation set, as described above. The output of NN 520 is desired to be a higher-quality version of POC16. Thus, POC0_HQ, 540, may be used as a proxy to achieve higher quality for POC16. In other words, POC0_HQ, 540, may be used to train NN 520 to predict a high-quality version of POC16.

Figure 6:
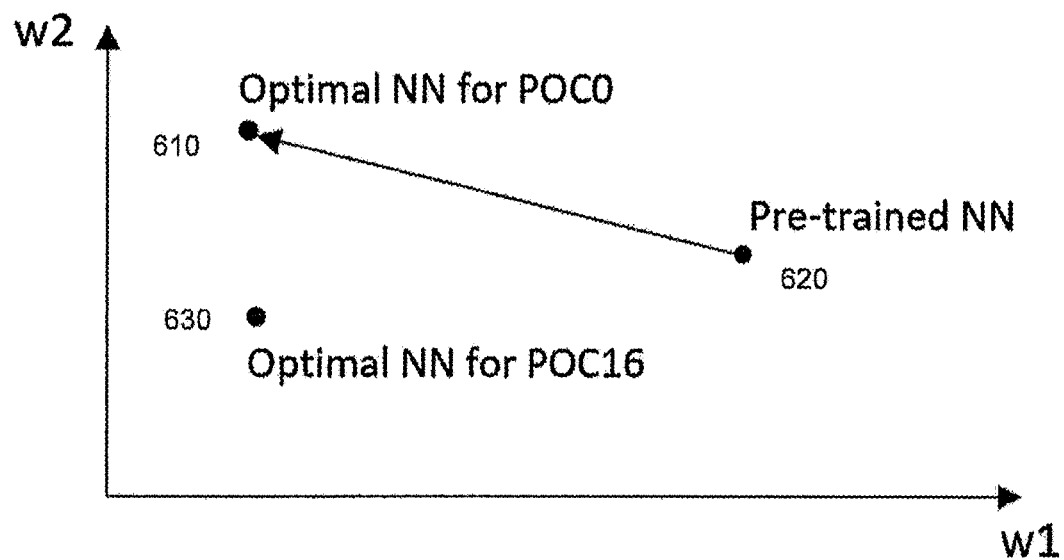
FIG. 6 is a graph illustrating features as described herein.

However, this method of training NN 520 may result in NN 520 overfitting to the POC0 such that it may not be able to generalize to POC16, even though there may be a lot of correlation between the two frames. Referring now to FIG. 6, illustrated is a high-level illustration of how the preceding method of optimization may result in overfitting. FIG. 6 illustrates a graph where the x and y axes are two weights of a neural network, for example neural network 520. FIG. 6 assumes that the weight space is two-dimensional, i.e., the NN has only two parameters or weights, for the sake of simplicity. A person of ordinary skill in the art would understand that the weight-space of a neural network may be much higher-dimensional than this. In the example of FIG. 6, a neural network is described in relation to these two weights.

Pre-trained NN 620 may be the neural network 520 of FIG. 5 before the optimization of FIG. 5 occurs. In the example of FIG. 6, the pre-trained NN 620 is not optimal for POC0 or for POC16 in terms of predicting a high-quality version based on a low-quality input. 610 describes an optimal NN for POC0, while 630 describes an optimal NN for POC16. The optimization process illustrated by FIG. 5, which uses only POC0, may specialize or train the NN to be optimal (or close to optimal) for POC0, 610, but, even though at a certain iteration of the optimization process the NN may be closer also to the optimal NN for POC16, 630, than the pre-trained NN, 620, at convergence near 610, the NN is away from the optimal NN for POC16, 630.

This convergence of the NN away from an optimal NN for POC16, 630 may be avoided in an example embodiment in which both POC0_LQ, 510, and POC16 are used in the optimization process. In an example embodiment, a trade-off may be obtained between exploiting the low quality to high quality mapping information contained in the pair [POC0_LQ (510), POC0_HQ (540)] and making sure that the NN does not get to a point in weight-space which is too far away from the optimal point for POC16, 630.

Figure 7:
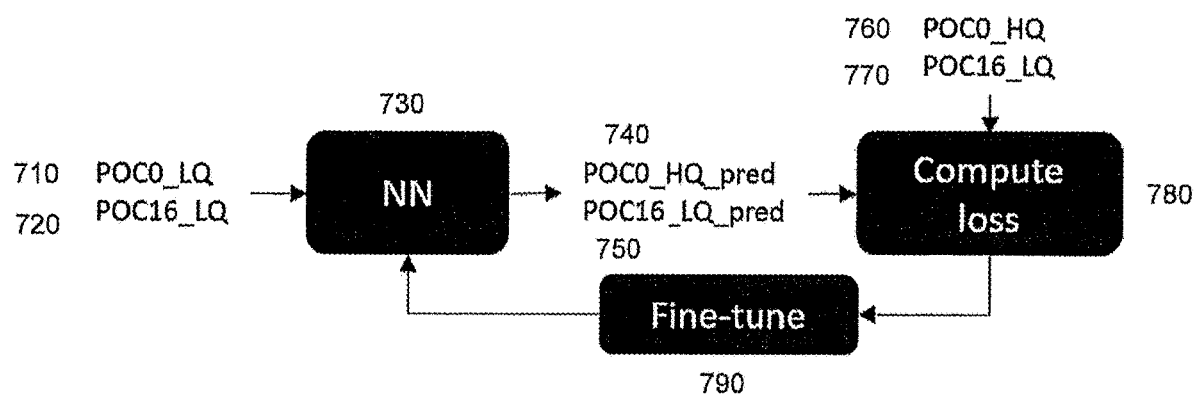
FIG. 7 is a diagram illustrating features as described herein.

Referring now to FIG. 7, illustrated is an example embodiment providing an optimization process using both POC0_LQ, 710, and POC16_LQ, 720, as input to the NN 730. The ground-truth, or value against which the prediction will be compared, for the input POC0_LQ, 710, may be POC0_HQ, 760. The ground-truth for the input POC16_LQ, 720, may be POC16_LQ, 770. Regularization of the optimization process may come from constraining the NN 730 to be able to at least reconstruct the same quality for POC0 as in the input.

In yet another example embodiment, the optimization process may use both POC0_LQ and POC16_LLQ as input to the NN. POC16_LLQ may be a requantized version of POC16_LQ, using a higher QP, thus POC16_LLQ has lower quality than POC16_LQ. The ground-truth for the input POC16_LLQ may be POC16_LQ.

In one example embodiment, an optimization process may be provided in which both POC0_LQ, 710, and POC16_LQ, 720 are used in the same input batch. Referring now to FIG. 7, POC0_LQ, 710, and POC16_LQ, 720 may be provided as input to NN 730 together. Based on this input, NN 730 may make two predictions: POC0_HQ_pred, 740, based on POC0_LQ, 710; and POC16_LQ_pred, 750, based on POC16_LQ, 720. At 780, the loss may be computed by combining losses computed by comparing POC0_HQ_pred, 740 with POC0_HQ, 760 and POC16_LQ_pred, 750 with POC16_LQ, 770. At 790, the decoder may fine-tune NN 730 based on the loss computed at 780.

Referring now to FIG. 8a, illustrated is a graph that may demonstrate the result of this example optimization process. Pre-trained NN 820, which may correspond to NN 730 of FIG. 7, may, as a result of the described optimization process, be optimized to have weights as at 840. It may be observed that the loss and associated gradients will be averaged over both frames and the fine-tuning progress can be smoother. In other words, by averaging the loss of the prediction based on POC0_LQ, 710 and the loss of the prediction based on POC16_LQ, 720, weights of the NN 730 may be achieved that are more optimal for each frame.

In another example embodiment, an optimization process may be provided in which both POC0_LQ, 710, and POC16_LQ, 720 are used, but in alternating input batches over the course of training. Referring now to FIG. 7, POC0_LQ, 710 may be used as input to NN 730 in a first batch. NN 730 may make a prediction, POC0_HQ_pred, 740. At 780, loss may be computed based on a comparison of POC0_HQ_pred, 740, and POC0_HQ, 760. At 790, the decoder may fine-tune NN 730 based on the loss computed at 780. Then, POC16_LQ, 720 may be used as input to NN 730 in a second batch. NN 730 may make a prediction, POC16_LQ_pred, 750. At 780, loss may be computed based on-a comparison of POC16_LQ, 770 and POC16_LQ_pred, 750. At 790, the decoder may fine-tune NN 730 based on the loss computed at 780. In this way, training may happen in alternate fashion. Note that while in the above example the first batch comprised POC0_LQ, 710, the first batch may instead comprise POC16_LQ, 720. Alternative methods of achieving an alternate fashion of training may be possible.

Referring now to FIG. 8b, illustrated is a graph that may demonstrate the result of this example optimization process. Pre-trained NN 820, which may correspond to NN 730 of FIG. 7, may, as a result of the described optimization process, be optimized to have weights as at 840. It may be noted that the fine-tuning progress can be less smooth in this example embodiment than the optimization process illustrated in FIG. 8a, but this example embodiment may be preferable in a case of limited available memory with respect to content size. By alternating the fine-tuning of NN 730 based on losses related to POC0-related frames and POC16-related frames, weights of the NN 730 may be achieved that are more optimal for each frame.

Referring now to both FIGS. 8a and 8b, as a result of the foregoing example embodiments, the NN may be optimized to a point in weight-space which is closer to both optimal points for POC0, 810, and POC16_HQ, 830, but not too biased towards POC0, 810. It should be noted that while POC0-related frames and POC16-related frames are used as inputs in the examples of FIGS. 5-8b, the example embodiments are not limited to use of these frames of a GOP or RAS to achieve NN optimization. The example embodiments may be implemented with use of any combination of high-quality and low-quality input data to prevent overfitting to a single data set.

Figure 9A:
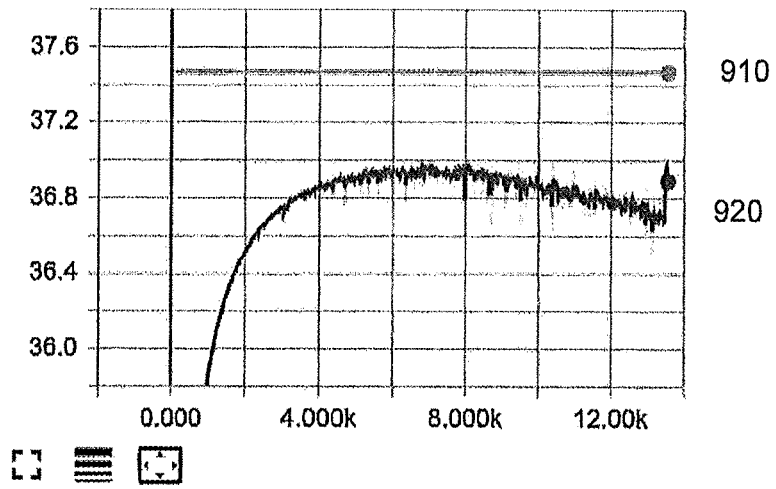
FIG. 9a is a graph illustrating features as described herein.
Figure 9B:
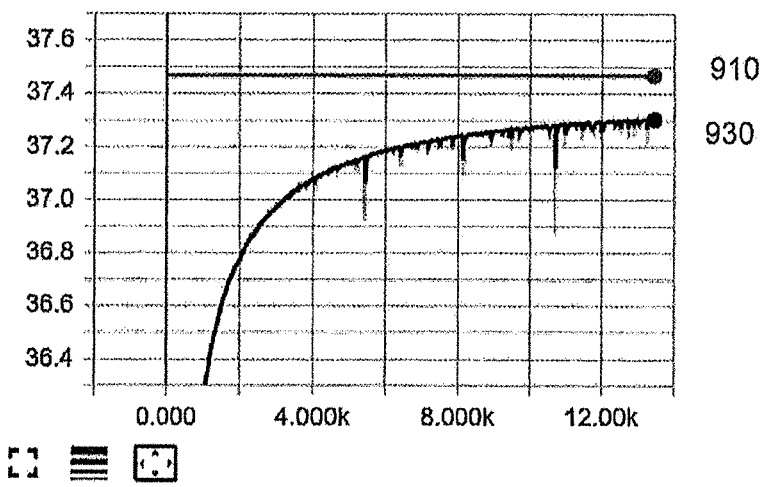
FIG. 9b is a graph illustrating features as described herein.

Referring now to FIGS. 9a and 9b, illustrated are examples of fine-tuning of an NN. FIG. 9a may correspond to the optimization process illustrated by FIG. 5, while FIG. 9b may correspond to the optimization process illustrated by FIG. 7.

FIG. 9a may be described by Table 1 below:

TABLE 1

Using POC0_LQ, 510, as NN 520 input in fine-tuning stage

| Sequence name | QP | Test frame | Input PSNR | Fine-tuned NN output PSNR |
|---|---|---|---|---|
| Tango | 22 | POC 16 | 42.045 | 42.020 |
| Tango | 37 | POC 16 | 39.093 | 39.070 |

FIG. 9b may be described by Table 2 below:

TABLE 2

Using POC0_LQ, 710, and POC16_LQ, 720, as NN 730 input in fine-tuning stage

| Sequence name | QP | Test frame | Input PSNR | Fine-tuned NN output PSNR |
|---|---|---|---|---|
| Tango | 22 | POC 16 | 42.045 | 42.046 |
| Tango | 37 | POC 16 | 39.093 | 39.092 |

FIG. 9a may demonstrate how not using the POC16 as input may causes the NN 520 to overfit to POC0, 910, and thus the PSNR on POC16, 920, gets worse after a certain iteration. FIG. 9b may illustrate how using POC16 as additional input avoids this behavior of the NN 730, as the PSNR keeps increasing, 930.

In an example embodiment, an encoder may be provided that performs the same type of optimization as a decoder described above, and which also monitors the accuracy on the low-quality frames or blocks using the ground-truth information it possesses. The encoder may encode information about the optimal stopping iteration (optimal for enhancing the lower quality frames or blocks), based on the monitoring, to the decoder, which may use this information for stopping its own optimization process based on the encoded information.

In an example embodiment, there may be provided an encoder that may perform the same optimization process as the decoder described in above example embodiments, but with the addition that the encoder may monitor how the NN performs on the POC16_LQ with respect to the real ground-truth for POC16, i.e., with respect to the original and uncompressed version of the POC16. The encoder may use as input a LQ first frame (derived from a higher quality version of that frame). The predicted output or frame may be used to compute a loss value by comparing it to the higher quality version of the first frame from which the LQ first frame was derived. The encoder may also use a LQ version of a second frame, to predict an output or frame that may be used to compute a loss value by comparing it to the same LQ second frame (i.e. the input). In contrast to the decoder, the encoder may also compute a monitoring loss value that might not be used for fine-tuning or training a neural network (which may have been used to produce the predicted output or frame). This monitoring loss value may be used to determine a good moment (iteration) to stop fine-tuning or training the neural network. This iteration number may be encoded into the bitstream and used by the decoder to stop its training. The monitoring loss value may be computed by computing the loss function using the output of the NN when the input is the LQ second frame and the ground-truth second frame. The ground-truth second frame may be the uncompressed second frame.

Figure 11:
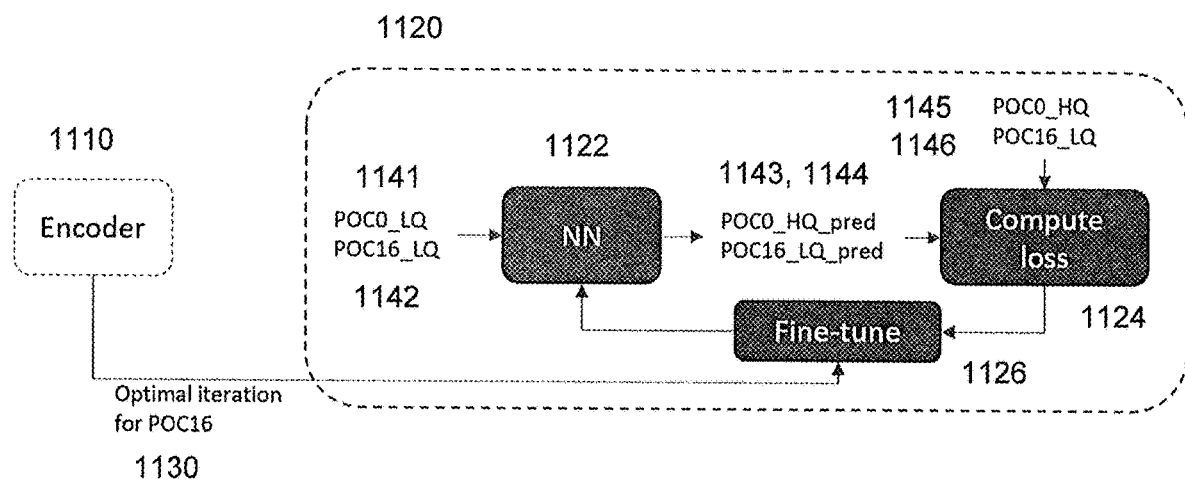
FIG. 11 is a diagram illustrating features as described herein.

Referring now to FIG. 11, illustrated is an example optimization process of NN 1122. Encoder 1110 may monitor a metric reflecting the fidelity, distortion, or quality, such as the Peak Signal-to-Noise Ratio (PSNR) or the MSE, computed between the POC16_LQ and POC16_GT (ground-truth) at the encoder side. The encoder 1110 may determine the number of iterations to be used in fine-tuning 1126 by, for example, selecting the iteration number that yields the maximum PSNR or minimum MSE. The encoder 1110 may signal the determined iteration number 1130 to the decoder 1120 for use in fine-tuning 1126. The optimal iteration for POC16, 1130, may be signaled in-band or out-of-band with respect to the encoded video bitstream, e.g. in an SEI message included in the access unit containing POC16 picture/video/frame.

Figure 10:
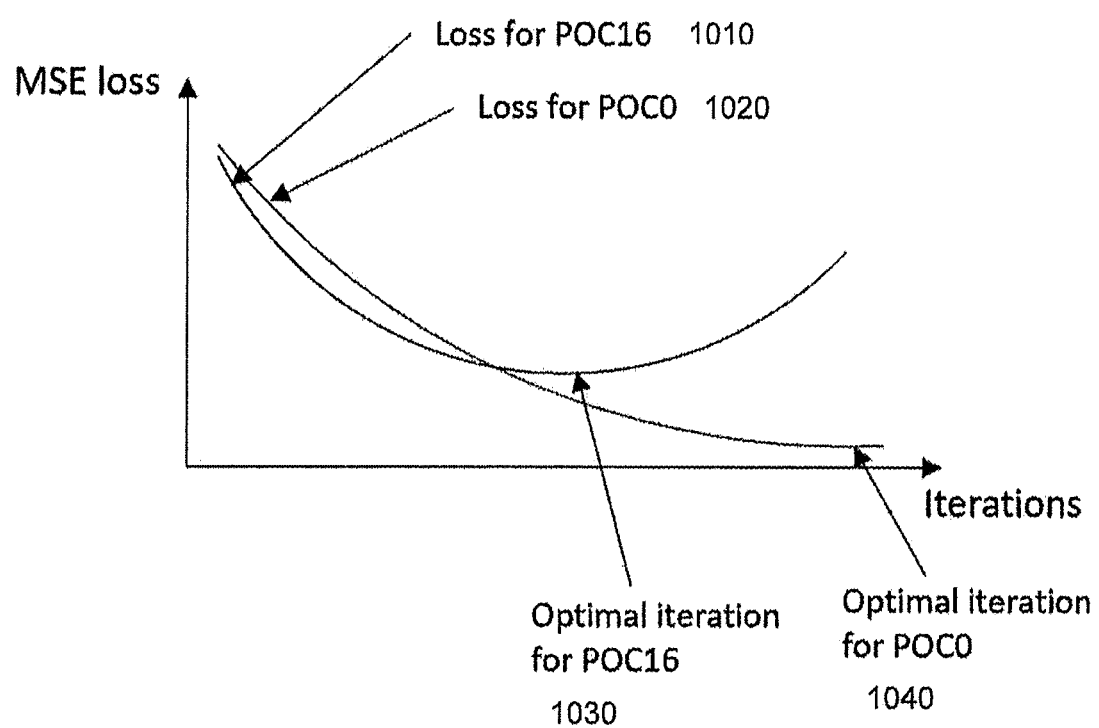
FIG. 10 is a graph illustrating features as described herein.

Referring now to FIG. 10, illustrated is a graph demonstrating the loss, here MSE loss, that may be achieved by successive iterations at the encoder side. 1020 illustrates the loss for POC0, which is the training loss (which is the same loss used at decoder side). 1040, the peak of the training loss curve, may demonstrate the optimal number of iterations for POC0. 1010 illustrates the loss for POC16, which is the monitoring loss. 1030, the peak of the monitoring curve, may demonstrate the optimal number of iterations for POC16. Based on the monitoring loss 1010, the encoder 1110 may be able to inform the decoder 1120 of the optimal number of iterations for POC16 1030, which in FIG. 11 is signaled to the decoder at 1130.

Referring now to FIG. 11, the decoder 1120 may decode a number of iterations to be used in fine-tuning from a signal 1130 sent by the encoder 1110, such as from or along the encoded video bitstream. The decoder 1120 may fine-tune the neural network according to the decoded number of iterations at 1126. The decoder 1120 may use the fine-tuned network 1122 for filtering the visual content decoded from the encoded video bitstream. A technical effect of the decoder 1120 receiving an indication of an optimal iteration for POC16, 1130, may be ensuring that the optimization process does not result in a NN 1122 that does not overfit based on fine-tuning based on POC0_LQ, i.e. the training set. Decoder 1120 may be comparable to the decoder carrying out the optimization process illustrated in FIG. 7. POC0_LQ 1141 may be comparable to POC0_LQ 710; POC16_LQ may be comparable to POC16_LQ 720; NN 1122 may be comparable to NN 730; POC0_HQ_pred 1143 may be comparable to POC0_HQ_pred 740; POC16_LQ_pred 1144 may be comparable to POC16_LQ_pred 750; compute loss module 1124 may be comparable to compute loss module 780; POC0_HQ 1145 may be comparable to POC0_HQ 760; POC16_HQ 1146 may be comparable to POC16_HQ 770; fine-tune module 1126 may be comparable to fine-tune module 790. Duplicative description has been omitted.

Figure 12A:
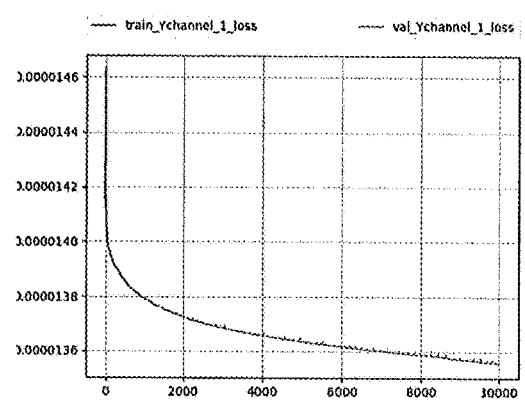
FIG. 12a is a graph illustrating features as described herein.
Figure 12B:
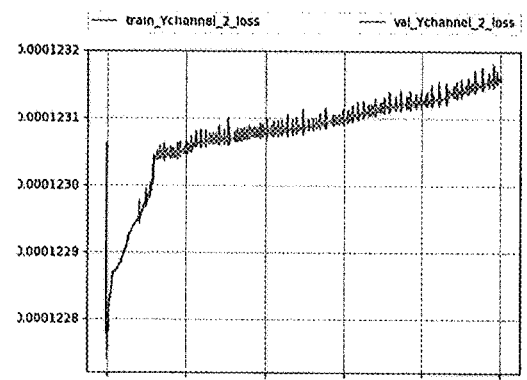
FIG. 12b is a graph illustrating features as described herein.

Referring now to FIGS. 12*a* and 12*b*, illustrated are graphs demonstrating training loss and loss on POC16, respectively. FIG. 12*a* may demonstrate a training loss that may result when both POC0_LQ and POC16_LQ are used as input for optimization of a neural network. FIG. 12*b* may demonstrate a loss on POC16 computed with respect to the uncompressed ground-truth POC16, which is known to encoder 1110. As can be seen in FIG. 12*b*, at a certain iteration, the loss starts to increase instead of decreasing, and that may be the optimal iteration number that needs to be encoded and signaled to the decoder.

Figure 13:
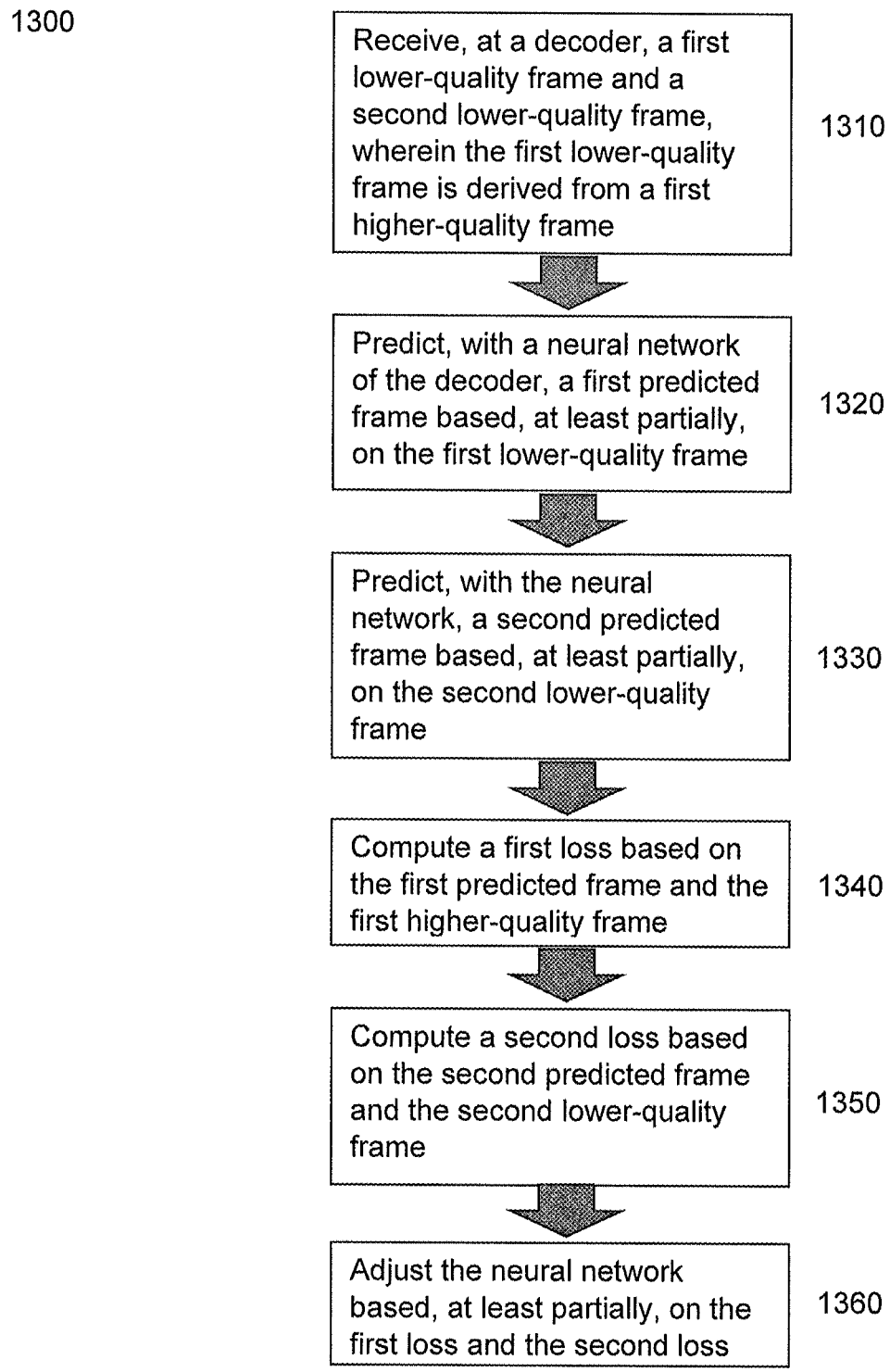
FIG. 13 is a flowchart illustrating steps as described herein.

FIG. 13 illustrates the potential steps of an example embodiment. In accordance with one aspect, an example method 1300 may be provided comprising: receiving, at a decoder, a first lower-quality frame and a second lower-quality frame, wherein the first lower-quality frame is derived from a first higher-quality frame, 1310; predicting, with a neural network of the decoder, a first predicted frame based, at least partially, on the first lower-quality frame, 1320; predicting, with the neural network, a second predicted frame based, at least partially, on the second lower-quality frame, 1330; computing a first loss based on the first predicted frame and the first higher-quality frame, 1340; computing a second loss based on the second predicted frame and the second lower-quality frame, 1350; and adjusting the neural network based, at least partially, on the first loss and the second loss, 1360.

FIG. 14 illustrates the potential steps of an example embodiment. In accordance with one aspect, an example method 1400 may be provided comprising: receiving, at a decoder, two frames, wherein the two frames comprise a first lower-quality frame and a second lower-quality frame, wherein the first lower-quality frame is derived from a first higher-quality frame, 1410; predicting, with a neural network of the decoder, a first predicted frame based, at least partially, on a first of the two frames, 1420; computing a first loss based on the first predicted frame and one of: where the first of the two frames comprises the first lower-quality frame, the first higher-quality frame, or where the first of the two frames comprises the second lower-quality frame, the second lower-quality frame, 1430; adjusting the neural network based, at least partially, on the first loss, 1440; predicting, with the adjusted neural network, a second predicted frame based, at least partially, on a second of the two frames, where the second of the two frames is different from the first of the two frames, 1450; computing, at the decoder, a second loss based on the second predicted frame and one of: where the second of the two frames comprises the first lower-quality frame, the first higher-quality frame, or where the second of the two frames comprises the second lower-quality frame, the second lower-quality frame, 1460; and adjusting the adjusted neural network based, at least partially, on the second loss, 1470.

Figure 15:
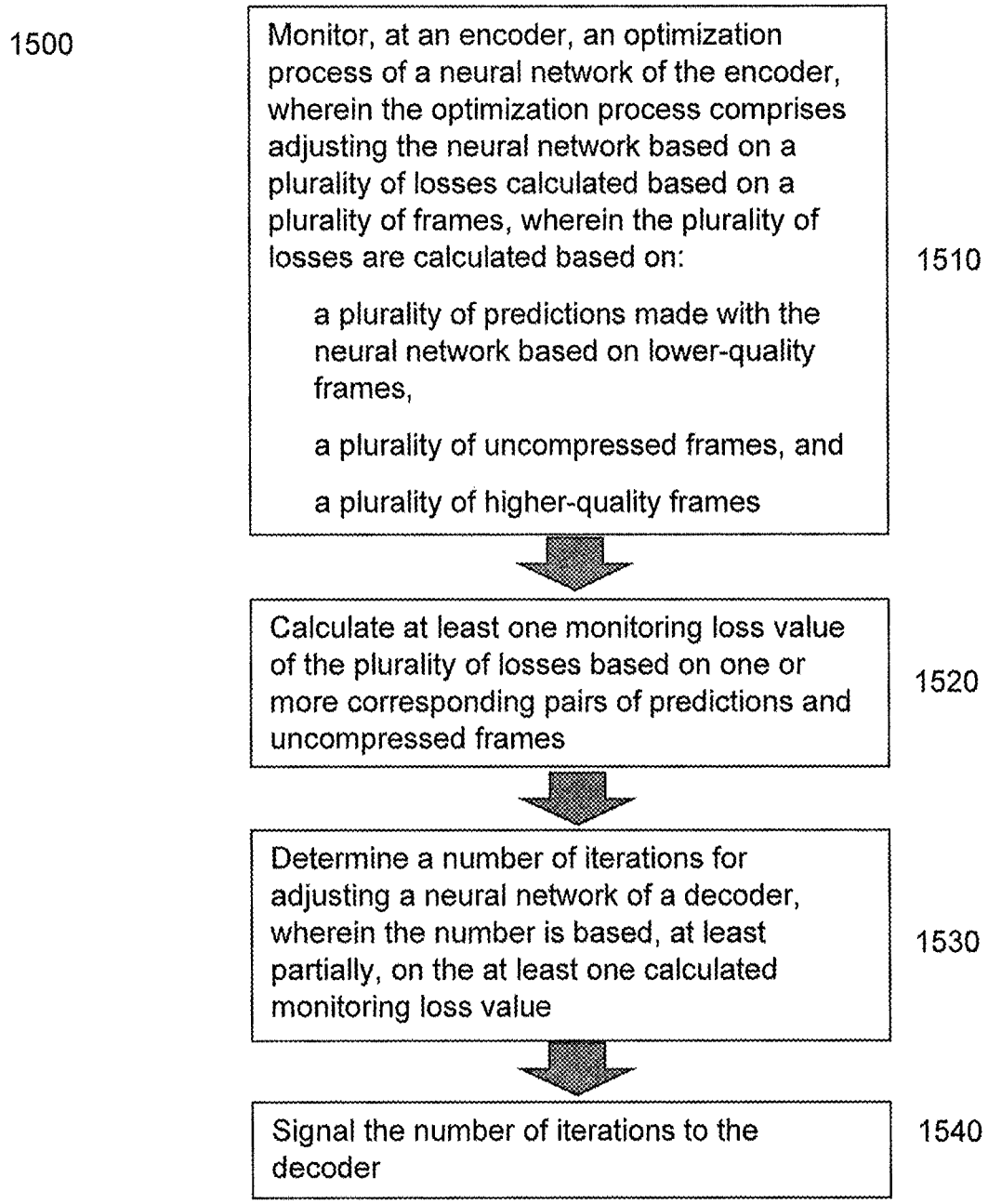
FIG. 15 is a flowchart illustrating steps as described herein.

FIG. 15 illustrates the potential steps of an example embodiment. In accordance with one aspect, an example method 1500 may be provided comprising: monitoring, at an encoder, an optimization process of a neural network of the encoder, wherein the optimization process comprises adjusting the neural network based on a plurality of losses calculated based on a plurality of frames, wherein the plurality of losses are calculated based on: a plurality of predictions made with the neural network based on lower-quality frames, a plurality of uncompressed frames, and a plurality of higher-quality frames, 1510; calculating at least one monitoring loss value of the plurality of losses based on one or more corresponding pairs of predictions and uncompressed frames, 1520; determining a number of iterations for adjusting a neural network of a decoder, wherein the number is based, at least partially, on the at least one calculated monitoring loss value, 1530; and signaling the number of iterations to the decoder, 1540.

In accordance with one aspect, an example method may be provided comprising: receiving, at a decoder, a first lower-quality frame and a second lower-quality frame, wherein the first lower-quality frame is derived from a first higher-quality frame; predicting, with a neural network of the decoder, a first predicted frame based, at least partially, on the first lower-quality frame; predicting, with the neural network, a second predicted frame based, at least partially, on the second lower-quality frame; computing, at the decoder, a first loss based on the first predicted frame and the first higher-quality frame; computing, at the decoder, a second loss based on the second predicted frame and the second lower-quality frame; and adjusting the neural network based, at least partially, on the first loss and the second loss.

The adjusting of the neural network may be further based on a signal received from an encoder, where the signal may be configured to indicate a number of iterations for adjusting the neural network.

The adjusting of the neural network based, at least partially, on the first loss and the second loss may comprise adjusting the neural network based on a weighted average of the first loss and the second loss.

The first loss and the second loss may comprise one of: a minimum squared error, a peak signal-to-noise ratio, or a structural similarity index.

The predicting of the first predicted frame and the predicting of the second predicted frame may be performed in one of: an alternating fashion, or in a concurrent fashion.

The example method may further comprise decoding a third frame with the adjusted neural network, wherein the third frame may belong to a different set than a set comprising the first higher-quality frame.

The first higher-quality frame and the second lower-quality frame may belong to an ordered set of frames, wherein the first higher-quality frame may be associated with an earlier order in the ordered set of frames than the second lower-quality frame.

The computing of the second loss based on the second predicted frame and the second lower-quality frame may comprise: computing the second loss based on the second predicted frame and an uncompressed version of the second lower-quality frame.

In accordance with one example embodiment, an apparatus may comprise: at least one processor; and at least one memory including computer program code; the at least one memory and the computer program code configured to, with the at least one processor, cause the apparatus to: receive a first lower-quality frame and a second lower-quality frame, wherein the first lower-quality frame is derived from a first higher-quality frame; predict, with a neural network of the apparatus, a first predicted frame based, at least partially, on the first lower-quality frame; predict, with the neural network, a second predicted frame based, at least partially, on the second lower-quality frame; compute a first loss based on the first predicted frame and the first higher-quality frame; compute a second loss based on the second predicted frame and the second lower-quality frame; and adjust the neural network based, at least partially, on the first loss and the second loss.

Adjusting the neural network may be further based on a signal received from an encoder, where the signal may be configured to indicate a number of iterations for adjusting the neural network.

Adjusting the neural network based, at least partially, on the first loss and the second loss may comprise adjusting the neural network based on a weighted average of the first loss and the second loss.

The first loss and the second loss may comprise one of: a minimum squared error, a peak signal-to-noise ratio, or a structural similarity index.

Predicting the first predicted frame and predicting the second predicted frame may be performed in one of: an alternating fashion, or in a concurrent fashion.

The at least one memory and the computer program code may be further configured to, with the at least one processor, cause the apparatus to: decode a third frame with the adjusted neural network, wherein the third frame may belong to a different set than a set comprising the first higher-quality frame.

The first higher-quality frame and the second lower-quality frame may belong to an ordered set of frames, wherein the first higher-quality frame may be associated with an earlier order in the ordered set of frames than the second lower-quality frame.

Computing the second loss based on the second predicted frame and the second lower-quality frame may comprise the at least one memory and the computer program code are configured to, with the at least one processor, cause the apparatus to: compute the second loss based on the second predicted frame and an uncompressed version of the second lower-quality frame.

In accordance with one example embodiment, an apparatus may comprise means for performing: receiving a first lower-quality frame and a second lower-quality frame, wherein the first lower-quality frame is derived from a first higher-quality frame; predicting, with a neural network, a first predicted frame based, at least partially, on the first lower-quality frame; predicting, with the neural network, a second predicted frame based, at least partially, on the second lower-quality frame; computing a first loss based on the first predicted frame and the first higher-quality frame; computing a second loss based on the second predicted frame and the second lower-quality frame; and adjusting the neural network based, at least partially, on the first loss and the second loss.

The adjusting of the neural network may be further based on a signal received from an encoder, where the signal may be configured to indicate a number of iterations for adjusting the neural network.

The adjusting of the neural network based, at least partially, on the first loss and the second loss may comprise adjusting the neural network based on a weighted average of the first loss and the second loss.

The first loss and the second loss may comprise one of: a minimum squared error, a peak signal-to-noise ratio, or a structural similarity index.

The means may be configured to perform predicting the first predicted frame and predicting the second predicted frame in one of: an alternating fashion, or in a concurrent fashion.

The means may be further configured to perform decoding a third frame with the adjusted neural network, wherein the third frame may belong to a different set than a set comprising the first higher-quality frame.

The first higher-quality frame and the second lower-quality frame may belong to an ordered set of frames, wherein the first higher-quality frame may be associated with an earlier order in the ordered set of frames than the second lower-quality frame.

The means for computing the second loss based on the second predicted frame and the second lower-quality frame may comprise means configured to perform computing the second loss based on the second predicted frame and an uncompressed version of the second lower-quality frame.

In accordance with one example embodiment, a non-transitory computer-readable medium comprising program instructions stored thereon which, when executed with at least one processor, cause the at least one processor to perform: receive a first lower-quality frame and a second lower-quality frame, wherein the first lower-quality frame is derived from a first higher-quality frame; predict, with a neural network of the apparatus, a first predicted frame based, at least partially, on the first lower-quality frame; predict, with the neural network, a second predicted frame based, at least partially, on the second lower-quality frame; compute a first loss based on the first predicted frame and the first higher-quality frame; compute a second loss based on the second predicted frame and the second lower-quality frame; and adjust the neural network based, at least partially, on the first loss and the second loss.

Adjusting the neural network may be further based on a signal received from an encoder, where the signal is configured to indicate a number of iterations for adjusting the neural network.

Adjusting the neural network based, at least partially, on the first loss and the second loss may comprise adjusting the neural network based on a weighted average of the first loss and the second loss.

The first loss and the second loss may comprise one of: a minimum squared error, a peak signal-to-noise ratio, or a structural similarity index.

Predicting the first predicted frame and predicting the second predicted frame may be performed in one of: an alternating fashion, or in a concurrent fashion.

The program instructions, when executed with the at least one processor, may cause the at least one processor to perform: decode a third frame with the adjusted neural network, wherein the third frame may belong to a different set than a set comprising the first higher-quality frame.

The first higher-quality frame and the second lower-quality frame may belong to an ordered set of frames, wherein the first higher-quality frame may be associated with an earlier order in the ordered set of frames than the second lower-quality frame.

Computing the second loss based on the second predicted frame and the second lower-quality frame may comprise the program instructions, when executed with the at least one processor, cause the at least one processor to perform:

compute the second loss based on the second predicted frame and an uncompressed version of the second lower-quality frame.

In accordance with one example embodiment, an apparatus may comprise: circuitry configured to perform receiving, at a decoder, a first lower-quality frame and a second lower-quality frame, wherein the first lower-quality frame is derived from a first higher-quality frame; predicting, with a neural network of the decoder, a first predicted frame based, at least partially, on the first lower-quality frame; predicting, with the neural network, a second predicted frame based, at least partially, on the second lower-quality frame; computing, at the decoder, a first loss based on the first predicted frame and the first higher-quality frame; computing, at the decoder, a second loss based on the second predicted frame and the second lower-quality frame; and adjusting the neural network based, at least partially, on the first loss and the second loss.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one aspect, an example method may be provided comprising: receiving, at a decoder, two frames, wherein the two frames comprise a first lower-quality frame and a second lower-quality frame, wherein the first lower-quality frame is derived from a first higher-quality frame; predicting, with a neural network of the decoder, a first predicted frame based, at least partially, on a first of the two frames; computing, at the decoder, a first loss based on the first predicted frame and one of: where the first of the two frames comprises the first lower-quality frame, the first higher-quality frame, or where the first of the two frames comprises the second lower-quality frame, the second lower-quality frame; adjusting the neural network based, at least partially, on the first loss; predicting, with the adjusted neural network, a second predicted frame based, at least partially, on a second of the two frames, where the second of the two frames is different from the first of the two frames; computing, at the decoder, a second loss based on the second predicted frame and one of: where the second of the two frames comprises the first lower-quality frame, the first higher-quality frame, or where the second of the two frames comprises the second lower-quality frame, the second lower-quality frame; and adjusting the adjusted neural network based, at least partially, on the second loss.

At least one of the adjusting of the neural network based, at least partially, on the first loss or the adjusting of the neural network based, at least partially, on the second loss may be further based on a signal received from an encoder, where the signal may be configured to indicate a number of iterations for adjusting the neural network.

The first loss and the second loss may comprise one of: a minimum squared error, a peak signal-to-noise ratio, or a structural similarity index.

The first higher-quality frame and the second lower-quality frame may belong to an ordered set of frames, wherein the first higher-quality frame may be associated with an earlier order in the ordered set of frames than the second lower-quality frame.

In accordance with one example embodiment, an apparatus may comprise: at least one processor; and at least one memory including computer program code; the at least one memory and the computer program code configured to, with the at least one processor, cause the apparatus to: receive two frames, wherein the two frames comprise a first lower-quality frame and a second lower-quality frame, wherein the first lower-quality frame is derived from a first higher-quality frame; predict, with a neural network of the apparatus, a first predicted frame based, at least partially, on a first of the two frames; compute a first loss based on the first predicted frame and one of: where the first of the two frames comprises the first lower-quality frame, the first higher-quality frame, or where the first of the two frames comprises the second lower-quality frame, the second lower-quality frame; adjust the neural network based, at least partially, on the first loss; predict, with the adjusted neural network, a second predicted frame based, at least partially, on a second of the two frames, where the second of the two frames is different from the first of the two frames; compute a second loss based on the second predicted frame and one of: where the second of the two frames comprises the first lower-quality frame, the first higher-quality frame, or where the second of the two frames comprises the second lower-quality frame, the second lower-quality frame; and adjust the adjusted neural network based, at least partially, on the second loss.

At least one of adjusting the neural network based, at least partially, on the first loss or adjusting the neural network based, at least partially, on the second loss may be further based on a signal received from an encoder, where the signal may be configured to indicate a number of iterations for adjusting the neural network.

The first loss and the second loss may comprise one of: a minimum squared error, a peak signal-to-noise ratio, or a structural similarity index.

The first higher-quality frame and the second lower-quality frame may belong to an ordered set of frames, wherein the first higher-quality frame may be associated with an earlier order in the ordered set of frames than the second lower-quality frame.

In accordance with one example embodiment, an apparatus may comprise means for performing: receiving two frames, wherein the two frames comprise a first lower-quality frame and a second lower-quality frame, wherein the first lower-quality frame is derived from a first higher-quality frame; predicting, with a neural network of the apparatus, a first predicted frame based, at least partially, on a first of the two frames; computing a first loss based on the first predicted frame and one of: where the first of the two frames comprises the first lower-quality frame, the first higher-quality frame, or where the first of the two frames comprises the second lower-quality frame, the second lower-quality frame; adjusting the neural network based, at least partially, on the first loss; predicting, with the adjusted neural network, a second predicted frame based, at least partially, on a second of the two frames, where the second of the two frames is different from the first of the two frames; computing a second loss based on the second predicted frame and one of: where the second of the two frames comprises the first lower-quality frame, the first higher-quality frame, or where the second of the two frames comprises the second lower-quality frame, the second lower-quality frame; and adjusting the adjusted neural network based, at least partially, on the second loss.

At least one of the adjusting of the neural network based, at least partially, on the first loss or the adjusting of the neural network based, at least partially, on the second loss may be further based on a signal received from an encoder, where the signal may be configured to indicate a number of iterations for adjusting the neural network.

The first loss and the second loss may comprise one of: a minimum squared error, a peak signal-to-noise ratio, or a structural similarity index.

The first higher-quality frame and the second lower-quality frame may belong to an ordered set of frames, wherein the first higher-quality frame may be associated with an earlier order in the ordered set of frames than the second lower-quality frame.

In accordance with one example embodiment, a non-transitory computer-readable medium comprising program instructions stored thereon which, when executed with at least one processor, cause the at least one processor to perform: receive two frames, wherein the two frames comprise a first lower-quality frame and a second lower-quality frame, wherein the first lower-quality frame is derived from a first higher-quality frame; predict, with a neural network embodied in the program instructions, a first predicted frame based, at least partially, on a first of the two frames; compute a first loss based on the first predicted frame and one of: where the first of the two frames comprises the first lower-quality frame, the first higher-quality frame, or where the first of the two frames comprises the second lower-quality frame, the second lower-quality frame; adjust the neural network based, at least partially, on the first loss; predict, with the adjusted neural network, a second predicted frame based, at least partially, on a second of the two frames, where the second of the two frames is different from the first of the two frames; compute a second loss based on the second predicted frame and one of: where the second of the two frames comprises the first lower-quality frame, the first higher-quality frame, or where the second of the two frames comprises the second lower-quality frame, the second lower-quality frame; and adjust the adjusted neural network based, at least partially, on the second loss.

At least one of adjusting the neural network based, at least partially, on the first loss or adjusting the neural network based, at least partially, on the second loss may be further based on a signal received from an encoder, where the signal may be configured to indicate a number of iterations for adjusting the neural network.

The first loss and the second loss may comprise one of: a minimum squared error, a peak signal-to-noise ratio, or a structural similarity index.

The first higher-quality frame and the second lower-quality frame may belong to an ordered set of frames, wherein the first higher-quality frame may be associated with an earlier order in the ordered set of frames than the second lower-quality frame.

In accordance with one aspect, an example method may be provided comprising: monitoring, at an encoder, an optimization process of a neural network of the encoder, wherein the optimization process comprises adjusting the neural network based on a plurality of losses calculated based on a plurality of frames, wherein the plurality of losses are calculated based on: a plurality of predictions made with the neural network based on lower-quality frames, a plurality of uncompressed frames, and a plurality of higher-quality frames; calculating at least one monitoring loss value of the plurality of losses based on one or more corresponding pairs of predictions and uncompressed frames; determining a number of iterations for adjusting a neural network of a decoder, wherein the number is based, at least partially, on the at least one calculated monitoring loss value; and signaling the number of iterations to the decoder.

The signaling of the number of iterations may comprise at least one of: in-band signaling of the number of iterations with respect to a video bitstream encoded with the encoder, out-of-band signaling of the number of iterations with respect to the video bitstream encoded with the encoder, or including the number of iterations in a supplemental enhancement message.

The plurality of losses may comprise one of: a minimum squared error, a peak signal-to-noise ratio, or a structural similarity index.

The determining of the number of iterations for adjusting the neural network may comprise determining a minimum of the plurality of losses.

At least one loss of the plurality of losses may be calculated based on a first predicted frame of the plurality of predictions and a first higher-quality frame of the plurality of higher-quality frames, wherein the first predicted frame may comprise a frame predicted based on a first lower-quality frame of the lower-quality frames that corresponds to the first higher-quality frame; and at least one other loss of the plurality of losses may be calculated based on a second predicted frame of the plurality of predictions and an uncompressed frame of the plurality of uncompressed frames, wherein the second predicted frame may comprise a frame predicted based on a second lower-quality frame corresponding to the uncompressed frame.

In accordance with one example embodiment, an apparatus may comprise: at least one processor; and at least one memory including computer program code; the at least one memory and the computer program code configured to, with the at least one processor, cause the apparatus to: monitor an optimization process of a neural network of the apparatus, wherein the optimization process comprises adjusting the neural network based on a plurality of losses calculated based on a plurality of frames, wherein the plurality of losses are calculated based on: a plurality of predictions made with the neural network based on lower-quality frames, a plurality of uncompressed frames, and a plurality of higher-quality frames; calculate at least one monitoring loss value of the plurality of losses based on one or more corresponding pairs of predictions and uncompressed frames; determine a number of iterations for adjusting a neural network of a decoder, wherein the number is based, at least partially, on the at least one calculated monitoring loss value; and signal the number of iterations to the decoder.

Signaling the number of iterations may comprise at least one of: in-band signaling of the number of iterations with respect to a video bitstream encoded with the encoder, out-of-band signaling of the number of iterations with respect to the video bitstream encoded with the encoder, or including the number of iterations in a supplemental enhancement message.

The plurality of losses may comprise one of: a minimum squared error, a peak signal-to-noise ratio, or a structural similarity index.

Determining the number of iterations for adjusting the neural network may comprise determining a minimum of the plurality of losses.

At least one loss of the plurality of losses may be calculated based on a first predicted frame of the plurality of predictions and a first higher-quality frame of the plurality of higher-quality frames, wherein the first predicted frame may comprise a frame predicted based on a first lower-quality frame of the lower-quality frames that corresponds to the first higher-quality frame; and at least one other loss of the plurality of losses may be calculated based on a second predicted frame of the plurality of predictions and an uncompressed frame of the plurality of uncompressed frames, wherein the second predicted frame may comprise a frame predicted based on a second lower-quality frame corresponding to the uncompressed frame.

In accordance with one example embodiment, an apparatus may comprise means for performing: monitoring an optimization process of a neural network of the apparatus, wherein the optimization process comprises adjusting the neural network based on a plurality of losses calculated based on a plurality of frames, wherein the plurality of losses are calculated based on: a plurality of predictions made with the neural network based on lower-quality frames, a plurality of uncompressed frames, and a plurality of higher-quality frames; calculating at least one monitoring loss value of the plurality of losses based on one or more corresponding pairs of predictions and uncompressed frames; determining a number of iterations for adjusting a neural network of a decoder, wherein the number is based, at least partially, on the at least one calculated monitoring loss value; and signaling the number of iterations to the decoder.

The signaling of the number of iterations may comprise at least one of: in-band signaling of the number of iterations with respect to a video bitstream encoded with the encoder, out-of-band signaling of the number of iterations with respect to the video bitstream encoded with the encoder, or including the number of iterations in a supplemental enhancement message.

The plurality of losses may comprise one of: a minimum squared error, a peak signal-to-noise ratio, or a structural similarity index.

The determining of the number of iterations for adjusting the neural network may comprise determining a minimum of the plurality of losses.

At least one loss of the plurality of losses may be calculated based on a first predicted frame of the plurality of predictions and a first higher-quality frame of the plurality of higher-quality frames, wherein the first predicted frame may comprise a frame predicted based on a first lower-quality frame of the lower-quality frames that corresponds to the first higher-quality frame; and at least one other loss of the plurality of losses may be calculated based on a second predicted frame of the plurality of predictions and an uncompressed frame of the plurality of uncompressed frames, wherein the second predicted frame may comprise a frame predicted based on a second lower-quality frame corresponding to the uncompressed frame.

In accordance with one example embodiment, a non-transitory computer-readable medium comprising program instructions stored thereon which, when executed with at least one processor, cause the at least one processor to perform: monitor an optimization process of a neural network embodied in the program instructions, wherein the optimization process comprises adjusting the neural network based on a plurality of losses calculated based on a plurality of frames, wherein the plurality of losses are calculated based on: a plurality of predictions made with the neural network based on lower-quality frames, a plurality of uncompressed frames, and a plurality of higher-quality frames; calculate at least one monitoring loss value of the plurality of losses based on one or more corresponding pairs of predictions and uncompressed frames; determine a number of iterations for adjusting a neural network of a decoder, wherein the number is based, at least partially, on the at least one calculated monitoring loss value; and signal the number of iterations to the decoder.

Signaling the number of iterations may comprise at least one of: in-band signaling of the number of iterations with respect to a video bitstream encoded with the encoder, out-of-band signaling of the number of iterations with respect to the video bitstream encoded with the encoder, or including the number of iterations in a supplemental enhancement message.

The plurality of losses may comprise one of: a minimum squared error, a peak signal-to-noise ratio, or a structural similarity index.

Determining the number of iterations for adjusting the neural network comprises determining a minimum of the plurality of losses.

At least one loss of the plurality of losses may be calculated based on a first predicted frame of the plurality of predictions and a first higher-quality frame of the plurality of higher-quality frames, wherein the first predicted frame may comprise a frame predicted based on a first lower-quality frame of the lower-quality frames that corresponds to the first higher-quality frame; and at least one other loss of the plurality of losses may be calculated based on a second predicted frame of the plurality of predictions and an uncompressed frame of the plurality of uncompressed frames, wherein the second predicted frame may comprise a frame predicted based on a second lower-quality frame corresponding to the uncompressed frame.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. A method comprising:
receiving, at a decoder, a first lower-quality frame and a second lower-quality frame, wherein the first lower-quality frame is derived from a first higher-quality frame;
predicting, with a neural network of the decoder, a first predicted frame based, at least partially, on the first lower-quality frame;
predicting, with the neural network, a second predicted frame based, at least partially, on the second lower-quality frame;
computing, at the decoder, a first loss based on the first predicted frame and the first higher-quality frame;

computing, at the decoder, a second loss based on the second predicted frame and the second lower-quality frame; and adjusting the neural network based, at least partially, on the first loss and the second loss.

2. The method of claim 1, wherein the adjusting of the neural network is further based on a signal received from an encoder, where the signal is configured to indicate a number of iterations for adjusting the neural network.

3. The method of claim 1, wherein the adjusting of the neural network based, at least partially, on the first loss and the second loss comprises adjusting the neural network based on a weighted average of the first loss and the second loss.

4. The method of claim 1, wherein the first loss and the second loss comprise one of:
a minimum squared error,
a peak signal-to-noise ratio, or
a structural similarity index.

5. The method of claim 1, wherein the predicting of the first predicted frame and the predicting of the second predicted frame are performed in one of:
an alternating fashion, or
in a concurrent fashion.

6. The method of claim 1, further comprising decoding a third frame with the adjusted neural network, wherein the third frame belongs to a different set than a set comprising the first higher-quality frame.

7. The method of claim 1, wherein the first higher-quality frame and the second lower-quality frame belong to an ordered set of frames, wherein the first higher-quality frame is associated with an earlier order in the ordered set of frames than the second lower-quality frame.

8. The method of claim 1, wherein the computing of the second loss based on the second predicted frame and the second lower-quality frame comprises:
computing the second loss based on the second predicted frame and an uncompressed version of the second lower-quality frame.

9. An apparatus comprising:
at least one processor; and
at least one memory and computer program code;
wherein the at least one memory and the computer program code are configured to, with the at least one processor, cause the apparatus at least to perform:
receive a first lower-quality frame and a second lower-quality frame, wherein the first lower-quality frame is derived from a first higher-quality frame;
predict, with a neural network of the apparatus, a first predicted frame based, at least partially, on the first lower-quality frame;
predict, with the neural network, a second predicted frame based, at least partially, on the second lower-quality frame;
compute a first loss based on the first predicted frame and the first higher-quality frame;
compute a second loss based on the second predicted frame and the second lower-quality frame; and
adjust the neural network based, at least partially, on the first loss and the second loss.

10. The apparatus of claim 9, wherein adjusting the neural network is further based on a signal received from an encoder, where the signal is configured to indicate a number of iterations for adjusting the neural network.

11. The apparatus of claim 9, wherein adjusting the neural network based, at least partially, on the first loss and the second loss comprises adjusting the neural network based on a weighted average of the first loss and the second loss.

12. The apparatus of claim 9, wherein the first loss and the second loss comprise one of:
a minimum squared error,
a peak signal-to-noise ratio, or
a structural similarity index.

13. The apparatus of claim 9, wherein the first higher-quality frame and the second lower-quality frame belong to an ordered set of frames, wherein the first higher-quality frame is associated with an earlier order in the ordered set of frames than the second lower-quality frame.

14. The apparatus of claim 9, wherein computing the second loss based on the second predicted frame and the second lower-quality frame comprises the at least one memory and the computer program code are configured to, with the at least one processor, cause the apparatus to:
compute the second loss based on the second predicted frame and an uncompressed version of the second lower-quality frame.

15. A non-transitory computer-readable medium comprising program instructions stored thereon which, when executed with at least one processor, cause the at least one processor to perform:
receive a first lower-quality frame and a second lower-quality frame, wherein the first lower-quality frame is derived from a first higher-quality frame;
predict, with a neural network, a first predicted frame based, at least partially, on the first lower-quality frame;
predict, with the neural network, a second predicted frame based, at least partially, on the second lower-quality frame;
compute a first loss based on the first predicted frame and the first higher-quality frame;
compute a second loss based on the second predicted frame and the second lower-quality frame; and
adjust the neural network based, at least partially, on the first loss and the second loss.

16. The non-transitory computer-readable medium of claim 15, wherein adjusting the neural network is further based on a signal received from an encoder, where the signal is configured to indicate a number of iterations for adjusting the neural network.

17. The non-transitory computer-readable medium of claim 15, wherein adjusting the neural network based, at least partially, on the first loss and the second loss comprises adjusting the neural network based on a weighted average of the first loss and the second loss.

18. The non-transitory computer-readable medium of claim 15, wherein the first loss and the second loss comprise one of:
a minimum squared error,
a peak signal-to-noise ratio, or
a structural similarity index.

19. The non-transitory computer-readable medium of claim 15, wherein the first higher-quality frame and the second lower-quality frame belong to an ordered set of frames, wherein the first higher-quality frame is associated with an earlier order in the ordered set of frames than the second lower-quality frame.

20. The non-transitory computer-readable medium of claim 15, wherein computing the second loss based on the second predicted frame and the second lower-quality frame comprises the program instructions, when executed with the at least one processor, cause the at least one processor to perform:

compute the second loss based on the second predicted frame and an uncompressed version of the second lower-quality frame.

* * * * *